Patented May 23, 1933

1,910,580

UNITED STATES PATENT OFFICE

DOUGLAS FRANK TWISS, OF WYLDE GREEN, AND ROBERT GILBERT JAMES, OF SELLY OAK, BIRMINGHAM, ENGLAND, ASSIGNORS TO AMERICAN ANODE INCORPORATED, OF AKRON, OHIO, A CORPORATION OF DELAWARE

MANUFACTURE OF ARTICLES CONTAINING RUBBER OR SIMILAR MATERIAL

No Drawing. Application filed February 27, 1931, Serial No. 518,884, and in Great Britain March 31, 1930.

This invention comprises an improved method for coating semi-permeable material with rubber or the like from aqueous dispersions of the kinds hereinafter specified with or without the use of electrophoretic means.

The object of the invention is to coat the opposite sides of semi-permeable material, which may be shaped or in the form of sheet, with rubber or the like in such manner that good penetration of the rubber or the like coating into the semi-permeable material occurs.

The invention comprises contacting the semi-permeable material to be coated, on one side thereof with an acidified aqueous dispersion containing rubber or the like of acid reaction i. e. of pH value less than 7, and preferably containing individual particles possessing electropositive charges, and on the opposite side with normally alkaline aqueous dispersions of rubber or the like i. e. of pH value equal to or more than 7, thereby facilitating or effecting the coagulation of the dispersions of acid and alkaline reactions on both sides of the material respectively and leading in this way to penetration of the rubber or the like into the material.

The coagulation and penetration of the aqueous dispersions aforesaid can be aided by the employment of electrophoretic means as, for instance, by introducing an anode into the acidic aqueous dispersions aforesaid, which preferably contains individual particles possessing electropositive charges and a cathode into the aforesaid normally alkaline dispersions.

This invention includes the manufacture of articles comprising semi-permeable material covered on both sides with stout rubber walls. There can thus be produced stout walled rubber articles such as cups, flasks, in which the original porous material or membrane remains embedded.

If desired, the semi-permeable material may consist of fabric, parchment or woven rubber.

The normally alkaline aqueous dispersions as well as the acidified dispersions of acid reaction can be applied by any one or more of the known operations of dipping, spreading, spraying or electrophoresis.

The emulsions or dispersions comprise natural or artificial aqueous dispersions of rubber or similar vegetable resins such as gutta-percha or balata with or without the addition of the aqueous dispersions or emulsions of rubber-like substances such as the so-called synthetic rubbers or mineral rubbers or rubber substitutes such as factice or rubber reclaim or rubber waste or oils, for example, rape oil, or vulcanized oils or cellulose esters or proteins, for example, casein.

The dispersions may be concentrated and/or compounded or compounded and subsequently concentrated.

The compounding ingredients may be chosen from vulcanizing agents such as sulphur, fillers and reinforcing agents such as whiting, clay, barium sulphate, lithopone, lamp black, gas black, zinc oxide, accelerators of vulcanization, colouring matters, preservatives or softeners.

Aqueous dispersions of synthetic rubber, with or without any one or more of the hereinbefore mentioned compounding ingredients, may also be used.

An example of carrying the invention into effect is as follows:—

*Example 1*

An acid latex bath of the following composition:—

| | Parts by weight |
|---|---|
| Rubber | 95 |
| Sulphur | 3 |
| Zinc diethyldithiocarbamate | 0.5 |
| Zinc stearate | 1.5 | is made up as follows:—Sulphur, zinc diethyldithiocarbamate and zinc stearate are each separately prepared as 30% dispersions in normal (approximately 6%) acetic acid solution, using in each case 3% of casein calculated on the solid employed as the protective colloid. Such dispersions contain positively charged particles.

Latex which has been previously concentrated to about 60% rubber content by centrifuging is rendered practically ammoniafree by air blowing. The pH of the resulting latex should preferably not exceed 8. Neutral ammonium caseinate solution is now added to the latex followed by sufficient dilute acetic acid to give a dispersion containing 25% rubber, 0.4% casein and 5% acetic acid. This acid latex contains positively charged rubber particles. To this acid latex the three dispersions of sulphur, zinc diethyldithiocarbamate and zinc stearate are then added in the required amounts.

An alkaline latex dispersion is also prepared in known manner to have the following composition:—

| | Parts by weight |
|---|---|
| Rubber | 95 |
| Sulphur | 3 |
| Zinc diethyldithiocarbamate | 0.5 |
| Zinc oxide | 1.5 | to have a solid content of 25%–30% and to contain about 0.2% of ammonia. The particles in this dispersion are negatively charged.

A paper or parchment container is nearly filled with the acid latex dispersion as above prepared and immersed in the alkaline latex dispersion so that the levels inside and outside the container are approximately the same.

After a few minutes' immersion a coating of rubber forms on both sides of the container.

*Example 2*

A thicker coating than is obtained in Example 1 can be produced in the same time by immersing a lead electrode into each dispersion so that the electrode in the acid dispersion becomes the anode while that in the alkaline dispersion becomes the cathode and passing an initial current of, for example, two amperes per 100 sq. centimetres of immersed internal or external area of the container.

The deposits obtained upon the containers, subsequent to attaining a sufficient thickness may be washed, dried and vulcanized in known manner.

What we claim is:—

1. The method of coating permeable material with rubber which comprises placing one side of the permeable material in contact with an acidic aqueous dispersion of rubber, and the other side in contact with an alkaline aqueous dispersion of rubber, whereby the interaction of the two dispersions coagulates a layer of rubber on each side of the permeable material.

2. The method of coating permeable material with rubber which comprises placing one side of the permeable material in contact with an aqueous dispersion of rubber possessing an acid reaction and coagulable by alkali, and the other side in contact with an aqueous dispersion of rubber possessing an alkaline reaction and coagulable by acid, whereby the interaction of the two dispersions coagulates a layer of rubber on each side of the permeable material.

3. The method of coating permeable material with rubber which comprises placing one side of the permeable material in contact with an acidic aqueous dispersion of rubber, the suspended particles of which are electropositively charged, and which is coagulable by alkali, and placing the other side in contact with an alkaline aqueous dispersion of rubber, the suspended particles of which are electronegatively charged, and which is coagulable by acid, whereby the interaction of the two dispersions coagulates a layer of rubber on each side of the permeable material.

4. The method of coating permeable material with rubber which comprises placing one side of the permeable material in contact with an aqueous dispersion of rubber, the suspended particles of which are electropositively charged, placing the other side in contact with an aqueous dispersion of rubber, the suspended particles of which are electronegatively charged, and passing an electric current through the permeable material between an anode in the first named dispersion and a cathode in the second named dispersion until a layer of rubber of appreciable thickness is coagulated on each side of the permeable material.

5. The method of coating permeable material with rubber which comprises placing one side of the permeable material in contact with an acidic aqueous dispersion of rubber, the suspended particles of which are electropositively charged, and which is coagulable by alkali, placing the other side in contact with an alkaline aqueous dispersion of rubber, the suspended particles of which are electronegatively charged, and which is coagulable by acid, and passing an electric current through the permeable material between an anode in the acidic dispersion and a cathode in the alkaline dispersion, whereby a layer of rubber is coagulated on each side of the permeable material.

In witness whereof, we have hereunto signed our names.

DOUGLAS FRANK TWISS.
ROBERT GILBERT JAMES.